(12) United States Patent
Binkert et al.

(10) Patent No.: US 8,564,867 B2
(45) Date of Patent: Oct. 22, 2013

(54) FAIR TOKEN ARBITRATION SYSTEMS AND METHODS

(75) Inventors: Nathan Lorenzo Binkert, Redwood City, CA (US); Robert Samuel Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 119 days.

(21) Appl. No.: 13/386,382

(22) PCT Filed: Dec. 10, 2009

(86) PCT No.: PCT/US2009/067574
§ 371 (c)(1),
(2), (4) Date: Jan. 20, 2012

(87) PCT Pub. No.: WO2011/071499
PCT Pub. Date: Jun. 16, 2011

(65) Prior Publication Data
US 2012/0120468 A1    May 17, 2012

(51) Int. Cl.
*G06E 3/00* (2006.01)
*G02F 3/00* (2006.01)

(52) U.S. Cl.
USPC .......................................... 359/107; 359/108

(58) Field of Classification Search
USPC ................................................ 359/107, 108
See application file for complete search history.

(56) References Cited

U.S. PATENT DOCUMENTS

| 6,823,140 B1 | 11/2004 | Davidson |
| 2008/0183927 A1 | 7/2008 | Rofougaran |

OTHER PUBLICATIONS

Dana Vantrease et al., "Corona: System Implications of Emerging Nanophotonic Technology", In Proceedings of the 35th International Symposium on Computer Architecture (ISCA-35), Beijing, China, June. 2008.
International Search Report, PCT/US2009/067574, Aug. 23, 2010, 9 pages.
Linjie Zhou et al., "Design and evaluation of an arbitration-free passive optical crossbar for on-chip interconnection networks", Appl Phys A (2009) 95: 1111-1118, Feb. 20, 2009.
R.G. Beausoleil et al., "A Nanophotonic Interconnect for High-Performance Many-Core Computation", 2008 LEOS Newletter, Jun. 2008, pp. 15-22.

*Primary Examiner* — Jade R Chwasz

(57) ABSTRACT

Various embodiments of the present invention are directed to arbitration systems and methods. In one embodiment, an arbitration system comprises a loop-shaped arbitration waveguide (602), a loop-shaped hungry waveguide (603), and a loop-shaped broadcast waveguide (604). The arbitration, hungry, and broadcast waveguides optically coupled to a home node and a number of requesting nodes. The arbitration waveguide transmits tokens injected by the home node. A token extracted by a requesting node grants the node access to a resource for the duration or length of the token. The hungry waveguide transmits light injected by the home node. A requesting node in a hungry state extracts the light from the hungry waveguide. The broadcast waveguide transmits light injected by the home node such that the light indicates to requesting nodes not in the hungry state to stop extracting tokens from the arbitration waveguide.

15 Claims, 14 Drawing Sheets

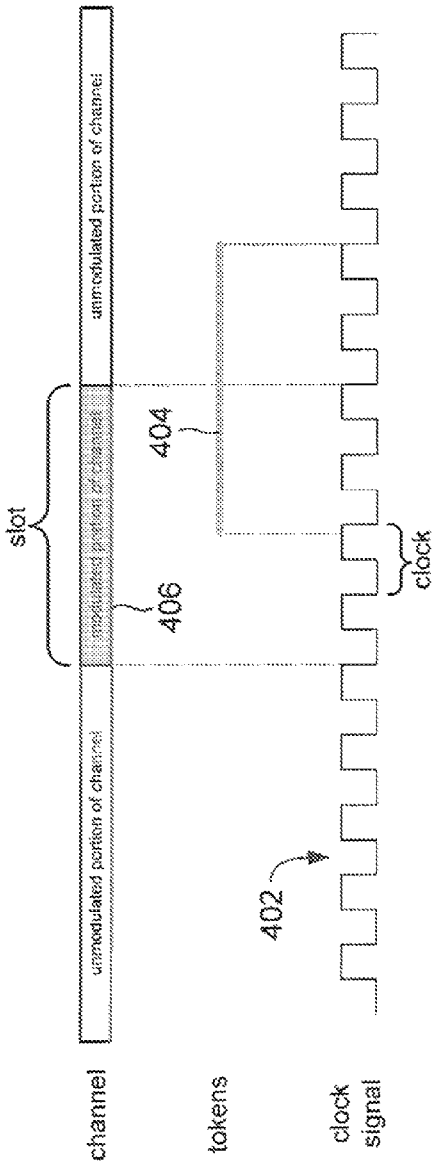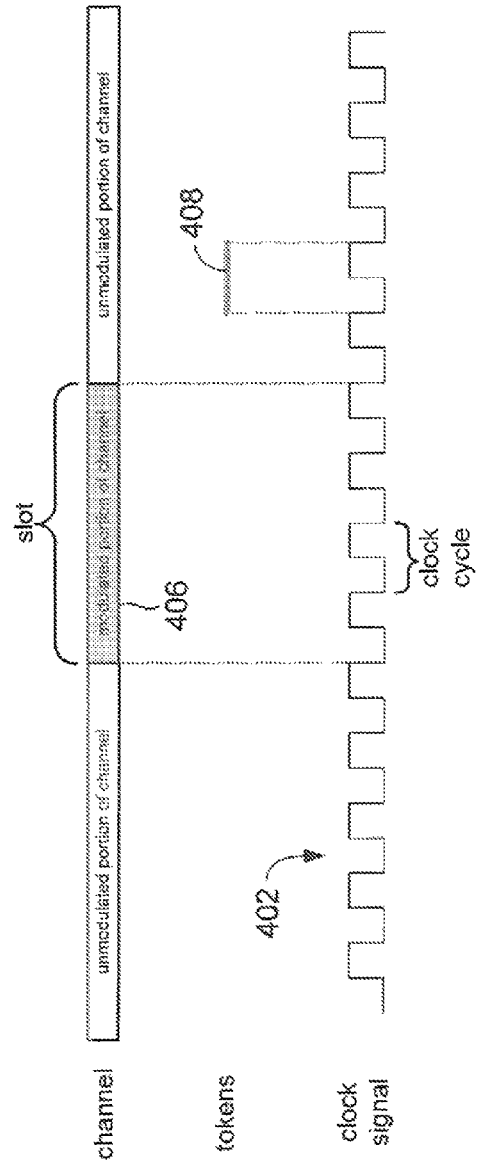

FAIR TOKEN ARBITRATION SYSTEMS AND METHODS

TECHNICAL FIELD

Embodiments of the present invention relate to optical devices and arbitration.

BACKGROUND

Modern distributed computer systems are typically composed of a number of independently operating nodes. A node can be a processor, memory, a circuit board, a server, a storage server, an external network connection or any other data processing, storing, or transmitting device. It is often the case that these independently operating nodes need access to the same resources. A resource can be a frequency channel of electromagnetic radiation (i.e., channel) used for transmitting information, or a resource can be a device, such as a broadcast bus. For example, two nodes may need to use a particular channel for transmitting information. Without coordination the two nodes may simultaneously attempt to use the same channel, resulting in lost information sent by both nodes.

In order to coordinate access to shared resources, computer systems often employ a conflict resolution scheme called "arbitration" to prevent two or more nodes from simultaneously using the same resource. When several nodes simultaneously request access to a resource, arbitration is used to select and grant one of the nodes access to the resource. Arbitration is critical to computer system performance. However, many arbiters often create latencies that can adversely affect system performance, increase service time, and lower resource utilization. In addition, many arbiters create unfair sharing of resources and may not scale adequately as the number of nodes and/or resources increase.

Engineers continue to seek arbitration systems and methods that provide high utilization and fair sharing of resources with low arbitration latency, low power consumption, and reduced hardware costs.

BRIEF DESCRIPTION OF THE DRAWINGS

FIGS. 4A-4B show two example representations of tokens and corresponding slots of a channel in accordance with two or more embodiments of the present invention.

DETAILED DESCRIPTION

Figure 1:
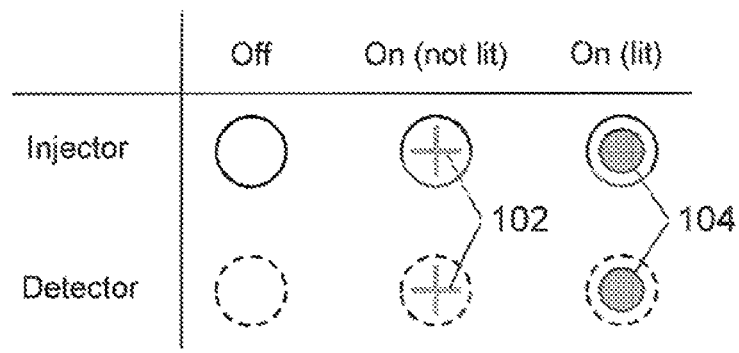
FIG. 1 shows a table representing "on" and "off" states of injectors and detectors in accordance with one or more embodiments of the present invention.

Various embodiments of the present invention are directed to arbitration systems and methods. Embodiments include a continuous, all-optical token-ring arbitration scheme that can be used to assign nodes exclusive access to a shared resource. System embodiments can be implemented with three continuous loop waveguides, each waveguide spanning all of the nodes, minimizing the latency overhead. When two or more nodes simultaneously request the right to use a resource, arbitration selects one of the requesting nodes and grants the node access to the resource. In granting the node access to the resource, arbitration system and method embodiments of the present invention satisfy the following requirements. (1) Arbitration is frequent. For example in a cache coherent many-core system, messages can be cache-line size or smaller. Area efficient nanophotonic waveguides and dense wavelength division multiplexing enable very wide channels that can transmit a cache line in one or two clock cycles. Thus, nearly every channel is arbitrated on nearly every clock cycle. (2) Arbitration is fast. Arbitration embodiments do not add unnecessary or excessively to the message transfer time by matching the latency of arbitration with the latency of communications. (3) Arbitration is effective. Arbitration embodiments yield high utilization of resources. End-to-end flow control can further improve bandwidth utilization by avoiding failed transmissions due to buffer overflows. In order to address this issue, embodiments of the present invention allow flow control information (i.e., credits) to be included in the arbitration signals. (4) Arbitration is fair. Nodes with equal needs for a resource receive equal access to the resource, and no node is deprived or starved of access to the resource. Bias in arbitration can cause longer queuing delays for packets from an unfairly treated node. Embodiments of the present invention ensure fairness by dynamically adjusting the arbitration priorities when the system detects an imbalance in services provided to the nodes.

The following description is organized into four subsections. The first subsection describes the optical components and introduces optical arbitration. The second subsection provides a general description of optical token-slot arbitration. The third subsection provides a description of optical fair token-slot arbitration system and method embodiments of the present invention. The fourth subsection provides a description of scalability of the arbitration systems and methods.

Note that the term "optical" refers to devices that operate in both the visible and non-visible portions of the electromagnetic spectrum. It should also be noted that while the examples used to describe various system and method embodiments of the present invention are composed of four nodes, these are just examples and various embodiments of the present invention are in no way restricted to providing arbitration for systems having just four nodes. Arbitration system and method embodiments can be scaled up or down to provide arbitration for systems having more, or fewer, than four nodes.

Optical Arbitration

System embodiments of the present invention employ optical communication structures such as waveguides and wavelength selective elements ("WSEs"). In certain embodiments, the WSEs and waveguides can be microring resonators and ridge waveguides. In other embodiments, the WSEs and waveguides can be photonic crystal resonant cavities and photonic crystal waveguides. Waveguides confine light traveling unidirectionally with negligible loss, and multiple wavelengths can use the same waveguide with no interference. A WSE can be configured with a resonance wavelength substantially matching a particular wavelength of light such that by placing the WSE adjacent to and within the evanescent field of light traveling in a waveguide, the WSE evanescently couples the wavelength of light from the waveguide and traps the light for a period of time. The resonance wavelength of a WSE can be electronically switched in and out of resonance with a wavelength of light carried by an adjacent waveguide, enabling the WSE to be operated as a modulator or a detector of light travelling in the adjacent waveguide, or the WSE can be operated to divert the light from the waveguide to another waveguide.

In the follow description, a WSE configured to detect light of a particular wavelength carried by an adjacent waveguide is called a "detector," and a WSE configured to divert light of a particular wavelength into an adjacent waveguide is called an "injector." FIG. 1 shows a table representing "on" and "off" states of injectors and detectors in accordance with one or more embodiments of the present invention. As shown in FIG. 1, injectors are represented by solid rings and detectors are represented by dashed rings. When a WSE is turned "on," the WSE is resonant with a particular wavelength of light and the light is coupled from an adjacent waveguide into the WSE. In the case of the injector, the light can be subsequently injecting into another adjacent waveguide, and in the case of the detector, the light is trapped within the detector and generates an electronic signal that can be used to indicate the light has been extracted from the adjacent waveguide. On the other hand, when a WSE is turned "off," the WSE is not resonant with the wavelength of light and the light passes the WSE unperturbed. Note that the table in FIG. 1 depicts two different "on" states for the injector and the detector indentified as "lit" and "not lit." The plus symbols 102 indicate that the WSE is turned "on" and ready to couple light from an adjacent waveguide, but no light is diverted. The solid circles 104 indicate that the WSE is turned "on" and light is being diverted into the WSE from an adjacent waveguide.

In certain embodiments, the WSE can be configured and operated so that the WSE is "on" when an appropriate voltage is applied to the WSE and when the voltage is no longer applied the WSE is "off." In other embodiments, the WSE can be configured and operated so that the WSE is "off" when an appropriate voltage is applied to the WSE and when the voltage is no longer applied the WSE is "on."

Figure 2:
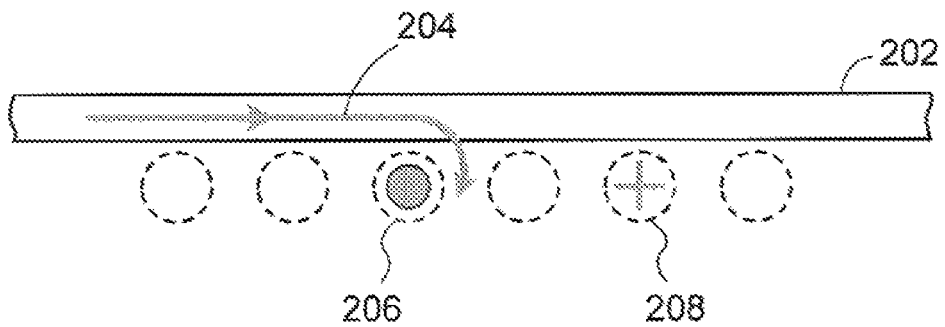
FIG. 2 shows an example of a light pulse extracted from a waveguide in accordance with one or more embodiments of the present invention.

FIG. 2 shows an example of a light pulse being extracted from a waveguide 202 in accordance with one or more embodiments of the present invention. The six detectors are configured to have resonance with the wavelength of a light pulse, represented by directional arrow 204, when turned "on." As shown in the example of FIG. 2, two of six detectors 206 and 208 are turned "on." The pulse 204 travels in one direction along the waveguide 202 and is coupled out of the waveguide 202 by the detector 206, because detector 206 is the first "on" detector the pulse 204 encounters along the waveguide 202. Note that because the detector 206 extracts the pulse 204 from the waveguide 202, the detector 208 remains "on" but is unable to detect the pulse 204. Detectors are configured to extract substantially all of the corresponding light from an adjacent waveguide and generate a corresponding electronic signal that can be used to confirm that the light has been extracted from the waveguide. The output of a detector is therefore a logical function of the state of all the detectors located closer to the pulse source. This wired-or-like combinatorial operation is performed without any delay other than the time of flight of light in the waveguide.

Because light flows in one direction in a waveguide, the terms "upstream" and "downstream" can be used to describe the relative locations of the detectors and nodes along the waveguide. For example, referring again to FIG. 2, because the pulse 204 reaches the detector 206 before it reaches the node 208, the node 206 can be referred to as being "upstream" of the node 208, alternatively the node 208 can be referred to as being "downstream" of the node 206.

FIG. 2 also represents a simple approach to optical arbitration in accordance with one or more embodiments of the present invention. The light pulse 204 can represent a single bit of information, and the waveguide 202 can represent a portion of an arbitration waveguide. In particular, the presence of the light pulse 204 represents the availability of a resource and is referred to as a "token." When the token is present the resource is available, and when the token is absent the resource is not available. Each of the six detectors can be electronically coupled to a different node (not shown). Nodes desiring to use the resource turn "on" their corresponding detectors. A node that does not want to use the resource leaves its corresponding detector turned "off." Thus, as shown in the example of FIG. 2, the node electronically coupled to the detector 206 extracts the entire token, gaining exclusive access to the corresponding resource, while the node electronically coupled to the downstream detector 208 has to wait for the next available token.

Optical Token-Slot Arbitration

Figure 3:
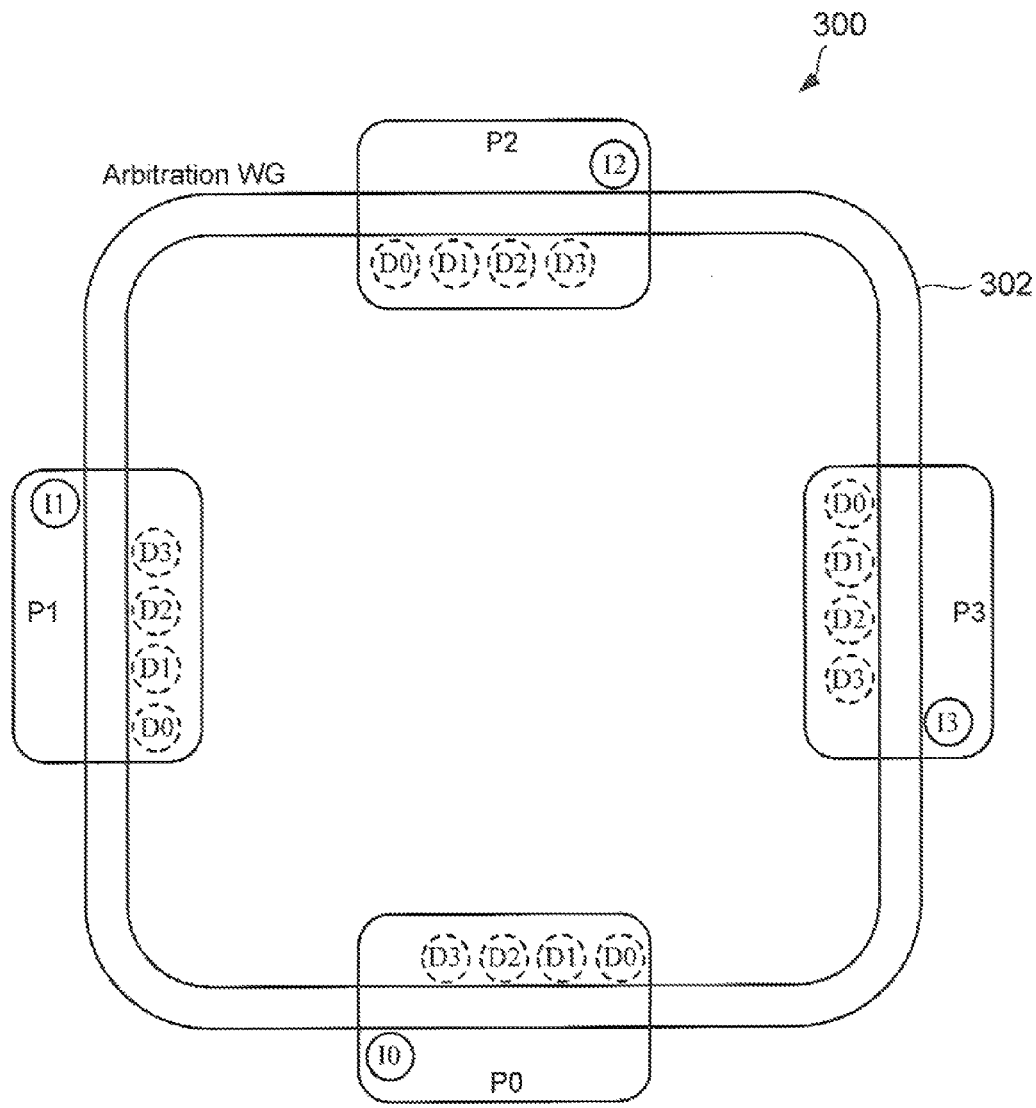
FIG. 3 shows an example of a token-slot arbitration system configured in accordance with one or more embodiments of the present invention.

FIG. 3 shows an example of an arbitration system 300 configured in accordance with one or more embodiments of the present invention. The arbitration system 300 enables each of four nodes P0, P1, P2, and P3 to control access to a particular resource. The arbitration system 300 includes a loop waveguide 302 that passes each of the four nodes. Each node includes an injector located adjacent to and lies within the evanescent fields of light traveling in the waveguide 302. For example, node P0 includes an injector labeled I0, node P1 includes an injector I1, and so on. Each node also includes a set of four detectors labeled D0, D1, D2, and D3. The detectors are also located adjacent to the waveguide 302 and lie within the evanescent fields of light traveling in the waveguide 302.

Each injector and each detector is configured to have resonance with a particular wavelength of light when turned "on." For example, the injectors I0, I1, I2, and I3 are resonant with the wavelengths $\lambda_0$, $\lambda_1$, $\lambda_2$, and $\lambda_3$, respectively, when turned "on," and the detectors D0, D1, D2, and D3 are also resonant with the wavelengths $\lambda_0$, $\lambda_1$, $\lambda_2$, and $\lambda_3$, respectively, when turned "on." The injectors are operated to place a token (i.e., pulse of light) onto the waveguide 302 indicating to the other nodes that the resource controlled by the node is available for use. For example, when the resource controlled by node P0 is available for use by the nodes P1, P2, and P3, the node P0 turns the injector I0 "on" for a period of time and places a token with the wavelength $\lambda_0$ onto the waveguide 302. In certain embodiments, the tokens can be injected into the waveguide by evanescently coupling light from a power waveguide (not shown) located adjacent to the injector I0. The power waveguide can be configured to loop around the outside of the arbitration waveguide and be optically coupled to light sources, such as a laser or a light-emitting diode ("LED"), that provide a continuous source of light with the wavelengths $\lambda_0$, $\lambda_1$, $\lambda_2$, and $\lambda_3$. In other embodiments, a light source can be disposed adjacent to the injector I0 and light is evanescently coupled from the light source into the arbitration waveguide via the injector I0. A node desiring to use a resource turns "on" the detector corresponding to the token associated with the resource and waits to extract and detect the token on the waveguide 302.

A resource can be located at a particular node, such as an output port, or a resource can be a common or shared resource that can be used by more than one node, such as bus waveguide or a particular frequency of light called a "channel" for transmitting information encoded in optical signals. A node with an available resource is called a "home node," and any node needing to use a resource is called a "requesting node." The terms "home node" and "requesting node" are relative terms, and are used to distinguish nodes with an available resource from other nodes needing to use a resource. For example, at one time, a first node can be a home node for a second node, and at a later time, the first node can be a requesting node to a third node.

In token-slot arbitration, the duration of the token can correspond to a time slot or length of time in which a requesting node gets access to an available resource, or the physical length of the token can correspond to a fixed length or physical slot or portion of a channel. Tokens circulating on the arbitration waveguide are in one-to-one correspondence to the slots. For example, one packet of information can represent one slot. FIG. 4A shows a first example of a token and corresponding slot of a channel in accordance with one or more embodiments of the present invention. FIG. 4A includes a local clock signal 402 of a requesting node. Line segment 404 represents a token. In the example of FIG. 4A, the token 404 has the duration of 4 clock cycles, but because the token is a pulse of light traveling in the arbitration waveguide, the token also have a physical length. The length of the token 404 may, in certain embodiments, correspond to the physical length of a slot in the channel used by the requesting node to transmit information to the home node. Rectangle 406 represents a slot in the channel having approximately the same physical length as the corresponding token 404. The requesting node waits for the arrival of the token 404, removes the token 404, and modulates the light of the channel in the corresponding slot 406. In this embodiment, the tokens can be spaced about four clock cycles apart. The slot 406 can represent one packet of information. Note that arrival of the token 404 precedes the slot 406 by some fixed number of clock cycles, such as two or more clock cycles, which are used to set up the data for transmission. Note also that the token 404 overlaps with two clock cycles of the slot 406. This is permitted provide the token has not also been encoded with information. The channel can be carried to the home node via a separate waveguide. The slot 406 is occupied by modulated light (i.e., data) until the slot gets to the home node, which removes the data, freeing the slot. Meanwhile, the home node continues to inject tokens.

Embodiments of the present invention are not limited to the token having the same duration or length as the slot of a channel or the same duration with which a resource can be used. In practice, the tokens generated by a home node can have any suitable length. FIG. 4B shows a second example of a token and corresponding slot of a channel in accordance with one or more embodiments of the present invention. In this example, the token 408 corresponding to the slot 406 is about one clock cycle. The requesting node waits for the arrival of the token 408, removes the token 408, and modulates the light in the corresponding slot 406.

Figure 5A:
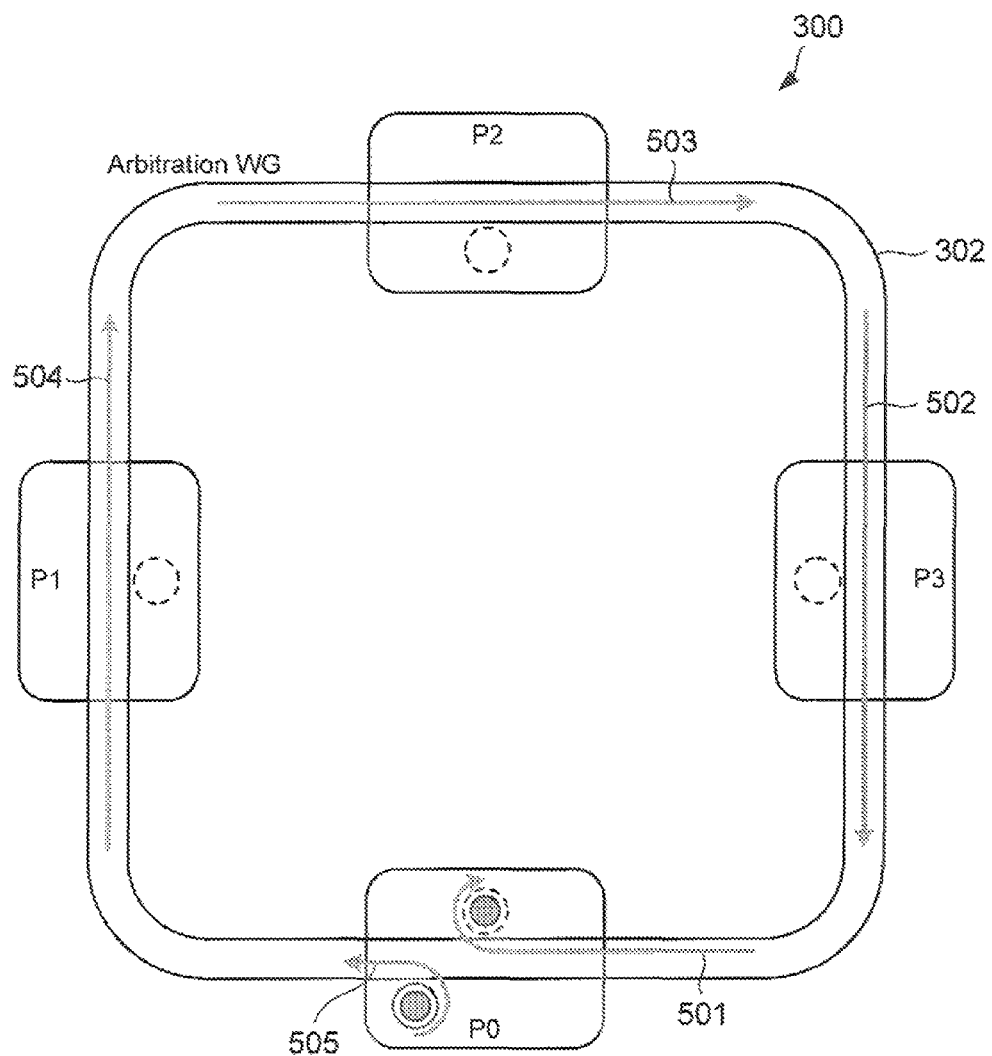
FIGS. 5A-5C show snapshots of a token-slot arbitration system during an example operation in accordance with one or more embodiments of the present invention.
Figure 5B:
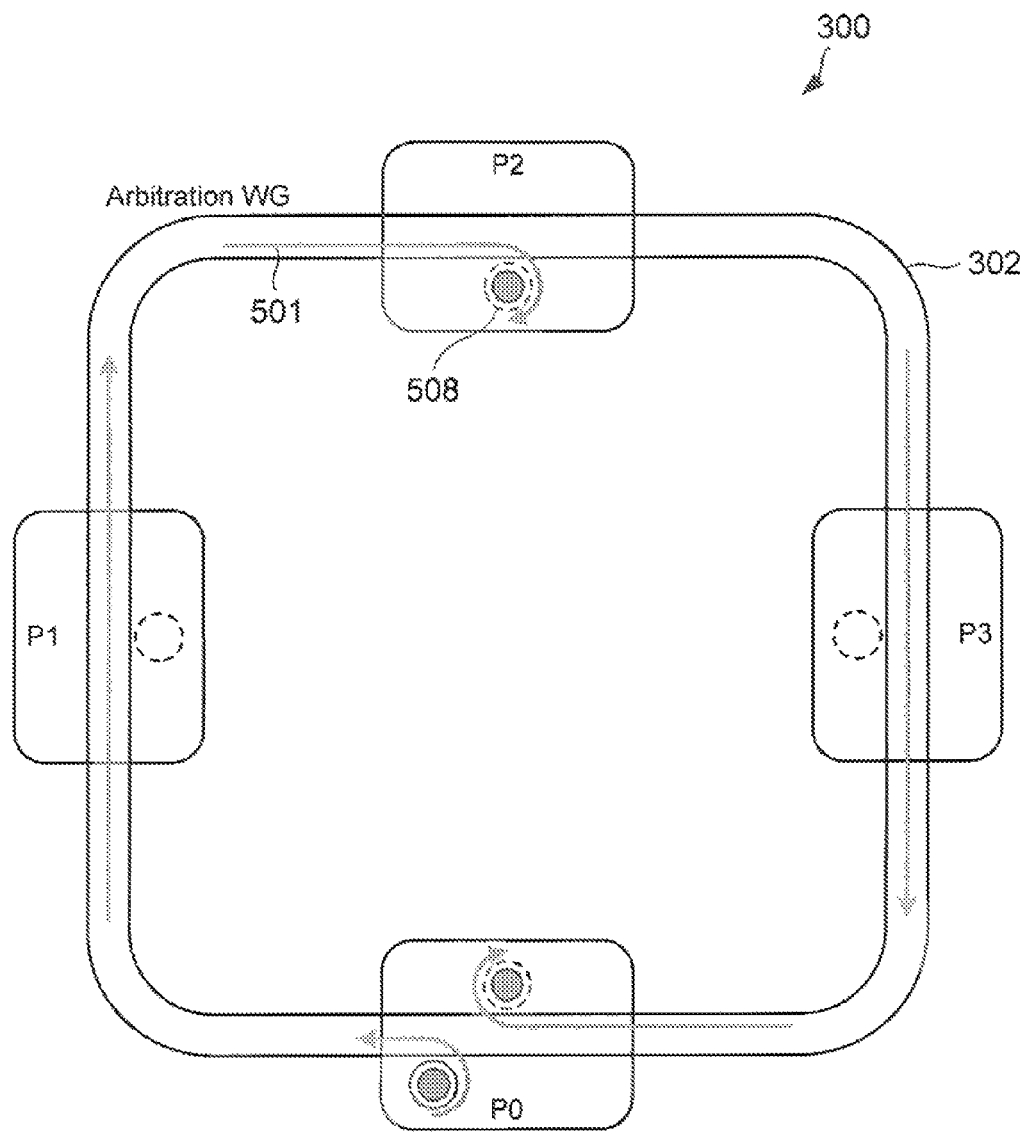
Figure 5C:
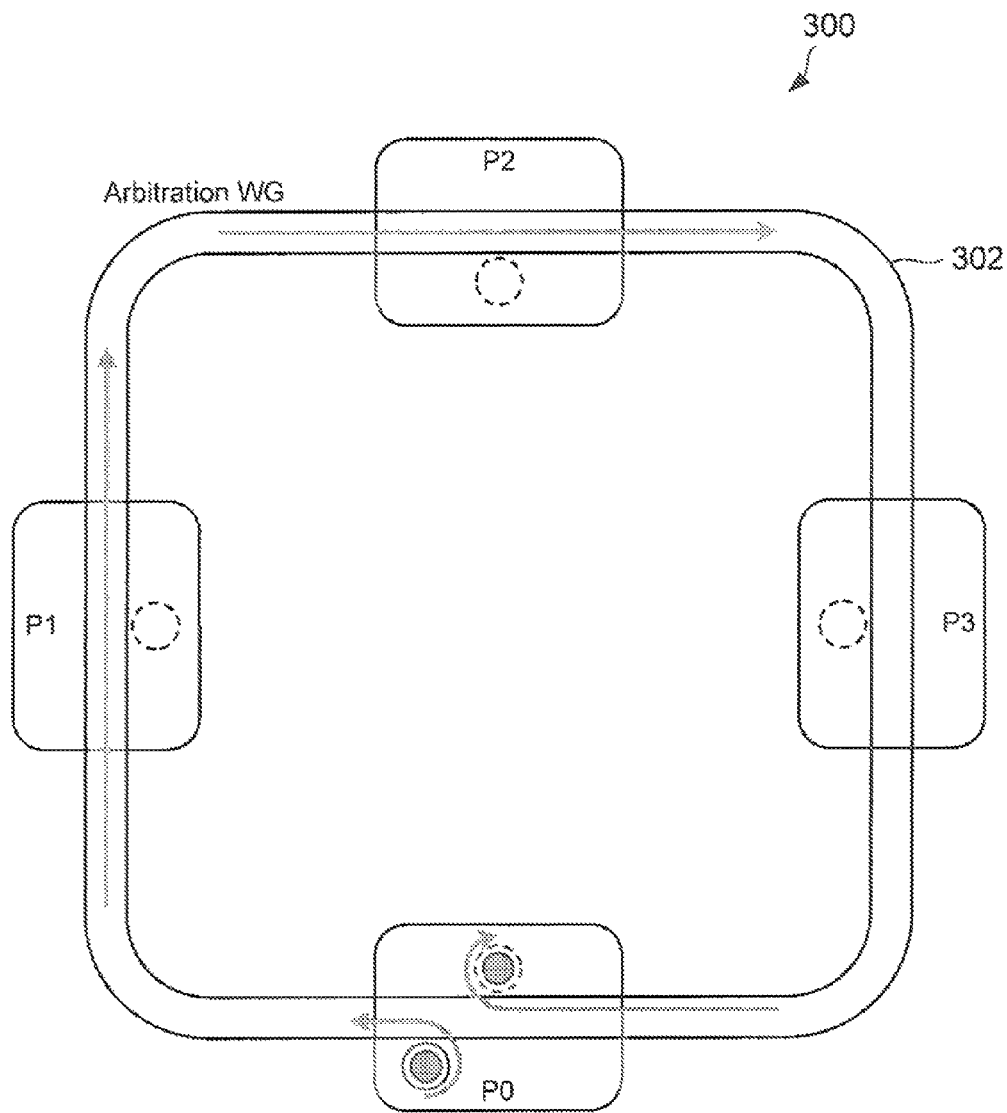

FIGS. 5A-5C show snapshots of the arbitration system 300 during an example operation in accordance with one or more embodiments of the present invention. In the example represented in FIGS. 5A-5C, node P0 is the home node that controls access to a resource, such a channel used by nodes P1, P2, and P3 to send information to node P0. For the sake of brevity and simplicity, only the injector of P0 used to place tokens corresponding to the resource is shown and only the detectors of nodes P1, P2, and P3 used to extract the tokens produced by node P0 are shown. As shown in the snapshot of FIG. 5A, node P0 places tokens represented by directional arrows 501-505 onto the arbitration waveguide 302. The tokens 501-505 are approximately regularly spaced in time and distance and have approximately the same length. The tokens can be in one-to-one correspondence with slots of the resource. Suppose that at some later time, node P2 needs to use the resource controlled by node P0. As shown in the snapshot of FIG. 5B, node P2 turns "on" the detector 508 and begins extracting a token 510 from the waveguide 302. Node P2 begins using the resource as described above with reference to FIG. 4. As shown in the snapshot of FIG. 5C, the token extracted by the node P2 does not pass node P3. Thus, node P3 does not have access to the resource associated with the token 510 extracted by the node P2. For example, where the resource is the channel used to transmit information to node P0, because the token 510 has been extracted by the node P2, the corresponding slot in the channel cannot be used by the node P3 to send information to node P0. If node P3 wants to send information to node P0, node P3 has to wait for the next available token, extract the token from the waveguide 302, and modulate the corresponding slot in the channel to encode the information.

Token-slot arbitration encodes flow control information by simply emitting a token only when a resource is available. Thus, each token signifies a single credit and if a requesting node removes a token, it has also reserved access to the resource at the home node. When access is relinquished, the home node emits a token.

Suppose for example that the aggregate demand for a channel's bandwidth is less than both its inherent maximum bandwidth and the rate at which the home node frees buffer slots. Token-slot arbitration described above can fairly satisfy this demand. However, fairness issues arise when the aggregate demand by requesting nodes exceeds this maximum achievable service rate. In practice, full input buffers will suppress the requesting nodes so that their aggregate packet insertion rate approaches, but never exceeds, this rate.

Optical Fair Token-Slot Arbitration

In token-slot arbitration described above, upstream nodes (i.e., nodes closest to the home node along the waveguide) have priority over nodes located farther downstream in obtaining tokens. Tokens taken by upstream nodes prevent downstream nodes from gaining access to the needed resource or services provided by the home node. Downstream requesting nodes deprived of a resource by upstream nodes are referred to as "hungry" nodes. For example, returning to the example shown in FIGS. 5A-5C, if nodes P1 and P2 take the tokens injected into the waveguide by home node P0, requesting node P3 is denied access to the resources and services provided by node P0 and node P3 becomes a "hungry" node.

Thus, the token-slot arbitration described above is inherently unfair because it gives higher priority to upstream nodes. On the other hand, fair token-slot arbitration embodiments of the present invention ensure fairness in that every requesting node is treated nearly equally by detecting hungry nodes and then servicing these nodes once each in some sequence before returning to token-slot arbitration. The essential idea is to switch between token-slot arbitration described above and an alternative that allocates credits to senders in a cyclic manner. In other words, during periods of little demand for a resource, token-slot arbitration describe above is used. However, when higher demand for the resource occurs, requesting nodes may receive less service than they need. Fair token-slot arbitration provides fixed quanta of credits to the under served requesting nodes, once each cycle, before returning to token-slot arbitration.

Figure 6:
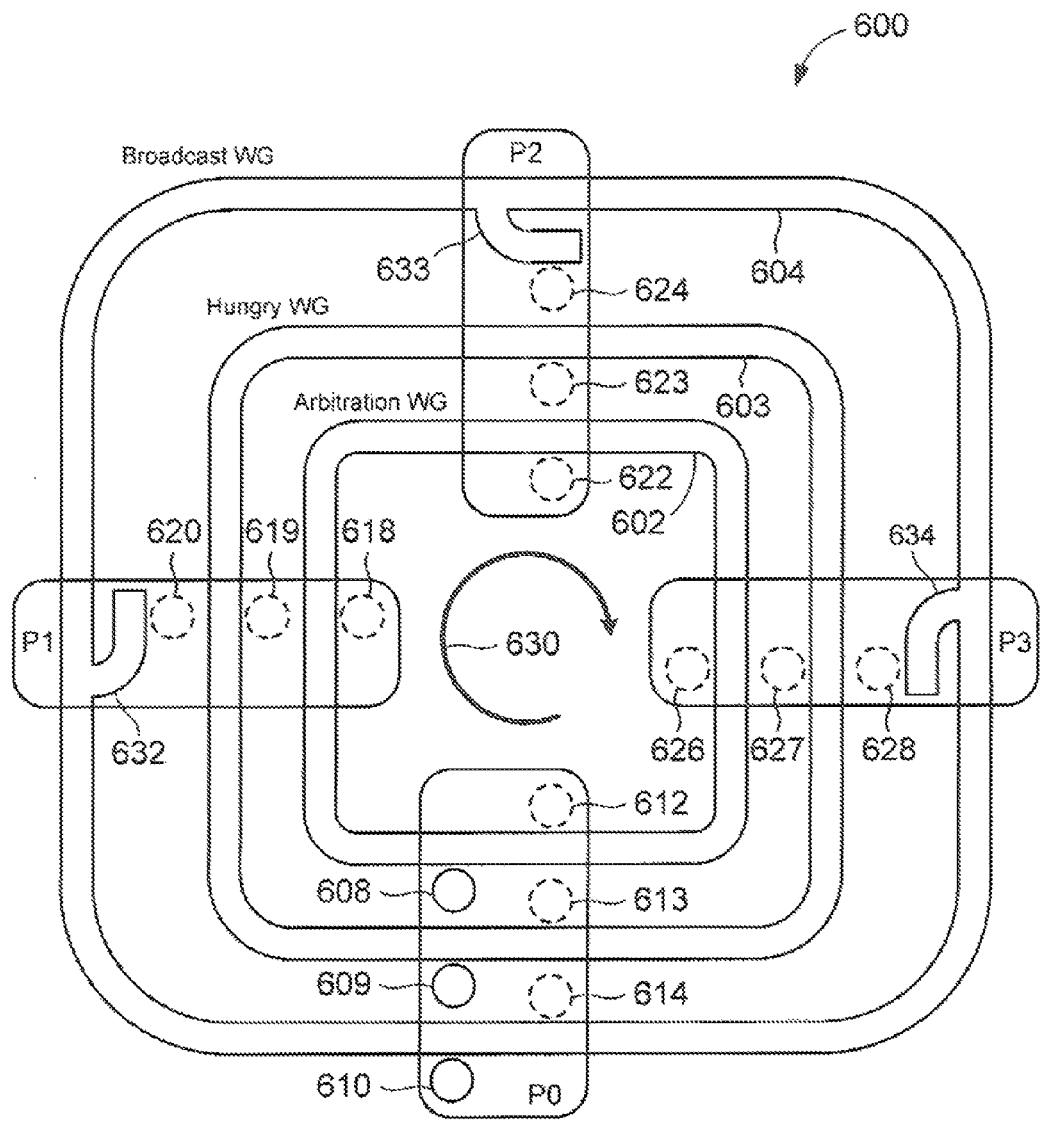
FIG. 6 shows an example of a fair token-slot arbitration system configured in accordance with one or more embodiments of the present invention.

FIG. 6 shows an example of a fair token-slot arbitration system 600 configured in accordance with one or more embodiments of the present invention. The system 600 includes an arbitration waveguide 602, a hungry waveguide 603, and a broadcast waveguide 604. As shown in FIG. 6, the arbitration, hungry, and broadcast waveguides are loop-shaped waveguides that pass each of the nodes. The system 600 enables home node P0 to control access to a resource offered to nodes P1, P2, and P3. The system 600 includes injectors 608-610 and detectors 612-614 electronically coupled to and operated by home node P0. As shown in the example of FIG. 6, the injectors 608-610 are evanescently coupled to the arbitration, hungry, and broadcast waveguides 602-604, respectively, and the detectors 612-614 are also evanescently coupled to the arbitration, hungry, and broadcast waveguides 602-604, respectively. The system 600 also includes detectors 616-618 electronically coupled to node P1 and evanescently coupled to the waveguides 602-604, respectively; detectors 622-624 electronically coupled to node P2 and evanescently coupled to the waveguides 602-604, respectively; and detectors 626-628 electronically coupled to node P3 and evanescently coupled to the waveguides 602-604, respectively. Home node P0 injects tokens into the arbitration waveguide 602 and light into the hungry and broadcast waveguides 603 and 604, the tokens and light traveling in the same direction identified by directional arrow 630. Note that broadcast waveguide 604 includes fractional splitters 632-634 that divert portions of the light carried by the broadcast waveguide 604 to the detectors 620, 624, and 628, respectively.

In certain embodiments, the tokens and light can be injected into the waveguides 602, 603, and 604 by evanescently coupling light from separate power waveguides (not shown) located adjacent to the injectors 608-610. The power waveguides can be configured to loop around the outside of the respective waveguides 602-604 and be optically coupled to light sources, such as lasers or LEDs. In other embodiments, the light sources can be disposed adjacent to the injectors 608-610 and light evanescently coupled from the light sources into the waveguides 602-604 via the injectors 608-610, respectively.

The WSEs and waveguides can be composed of an elemental semiconductor, such as ("Si") and germanium ("Ge"), or a III-V compound semiconductor, where Roman numerals III and V represent elements in the IIIa and Va columns of the Periodic Table of the Elements. Compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The WSEs can be configured as p-i-n junctions and electronically operated to control resonance with particular wavelengths of light traveling in the adjacent waveguides 602-604. In certain embodiments, an intrinsic WSE can be electronically operated by doping inner and outer regions of the substrate surrounding the WSE with appropriate p-type and n-type impurities. P-type impurities can be atoms that introduce vacant electronic energy levels called "holes" to the electronic band gaps of the WSE. These impurities are also called "electron acceptors." N-type impurities can be atoms that introduce filled electronic energy levels to the electronic band gap of the WSE. These impurities are called "electron donors." For example, boron ("B"), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the WSE can have impurity concentrations in excess of about $10^{15}$ impuritics/cm$^3$ while more heavy doping of the core 404 can have impurity concentrations in excess of about $10^{19}$ impurities/cm$^3$.

The waveguides and WSEs of the system 600 can be formed using nanoimprint lithography, reactive ion etching, focused beam milling or any other well-known method for forming nanoscale optical devices.

Figure 7:
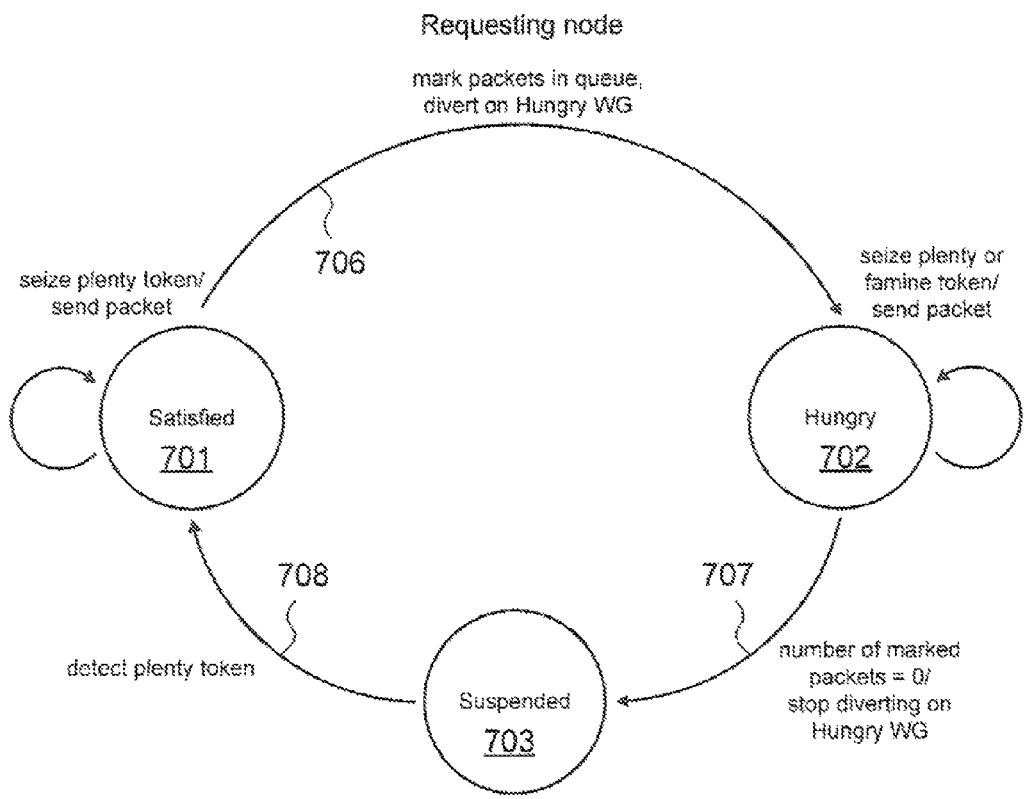
FIG. 7 shows an example state diagram of three states a requesting node passes through during arbitration in accordance with one or more embodiments of the present invention.

FIG. 7 shows an example state diagram of three states a requesting node passes through during arbitration in accordance with one or more embodiments of the present invention. As shown in the example of FIG. 7, each requesting node is in one of three possible states: satisfied 701, hungry 702, and suspended 703. As indicated by directional arrows 706-708, a requesting node cyclically traverses the state diagram from satisfied 701 to hungry 702 to suspended 703. A requesting node is in a satisfied state 701 when the node can extract a token from the arbitration waveguide and use the resource accordingly. The requesting node enters the hungry state 702 when the node must access a resource or other services provided by the home node but is unable to. For example, a satisfied node can enter the hungry state 702 according to a local criterion, such as the node is storing at least one old packet that has been stored at the node longer than some threshold of time W, or when its input queue length exceeds some queue length threshold, because there may be an upper bound L on the number of packets in the queue of a requesting node that enters the hungry state. Once the hungry requesting node has been able to access the resources or services provided by the home node, the requesting node enters the suspended state 703 in which the node passes on all tokens. Hungry nodes do not remain indefinitely in the hungry state and their time in the hungry state can be bound. The suspended state enables other hungry downstream nodes to in turn access the tokens. Passing through the states 701-703 in fair token-slot arbitration is described in greater detail below with regard to a specific example in FIGS. 9A-9D.

Figure 8:
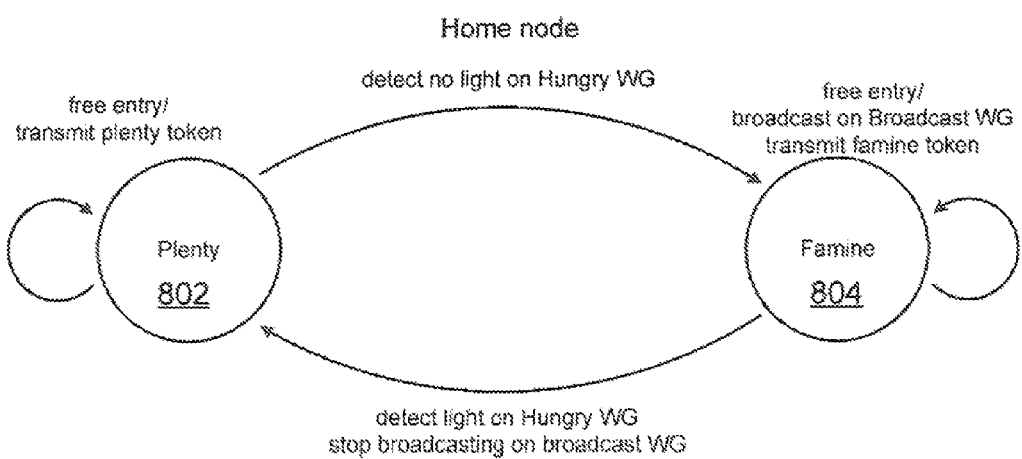
FIG. 8 shows an example state diagram of two states a resource passes through during arbitration in accordance with embodiments of the present invention.

FIG. 8 shows an example state diagram of the two states a resource passes through during arbitration in accordance with embodiments of the present invention. A resource is controlled by the home node and goes through alternating plenty and famine states 802 and 804 assigned by the home node. The famine state 802 occurs when the home node receives notification via the hungry waveguide that at least one requesting node is in the hungry state 702. The famine state 804 is communicated to the nodes using the broadcast waveguide where all nodes except for the hungry requesting nodes stop attempting to extract tokens from the arbitration waveguide. Tokens injected into the arbitration waveguide during the famine state are called "famine tokens." During the famine state 804 only the hungry requesting nodes can extract famine tokens while the other nodes let the famine tokens pass unperturbed. During the famine state, each hungry nodes gains access to the resources in sequential order from closest upstream hungry node to the farthest downstream hungry node. When a hungry node finishes uses the resource, the hungry node enters the suspended state. Once all of the hungry nodes have finished using the resource and entered the suspended state 703, the home node receives notification over the hungry waveguide and the resource enters the plenty state 802. Tokens injected into the arbitration waveguide during the plenty state are called "plenty tokens." Token-slot arbitration resumes and any node can take an available plenty token. Passing through the states 802 and 804 and using the hungry and broadcast waveguides in fair token-slot arbitration is described in greater detail below with regard to a specific example in FIGS. 9A-9D.

An example of fair token-slot arbitration is now described with reference to FIGS. 7, 8, and 9A-9D using the example arbitration system 600 described above with reference to FIG. 6. FIGS. 9A-9D show snapshots of the arbitration system 600 during an example operation in accordance with one or more embodiments of the present invention. In the following description suppose that the resource is a channel used by the nodes P1, P2, and P3 to send information to the node P0. In other words, node P0 is the home node and nodes P1, P2, and P3 can be requesting nodes. The channel can be carried on a separate waveguide (not shown) that passes each of the nodes P1, P2, and P3 and terminates at the node P0. It should be noted that the arbitration systems and methods described below are not limited to providing arbitration of channels, but can also be used to control access to other resources, such as buses, input and output, ports, and other shared devices and services provided by a home node.

Figure 9A:
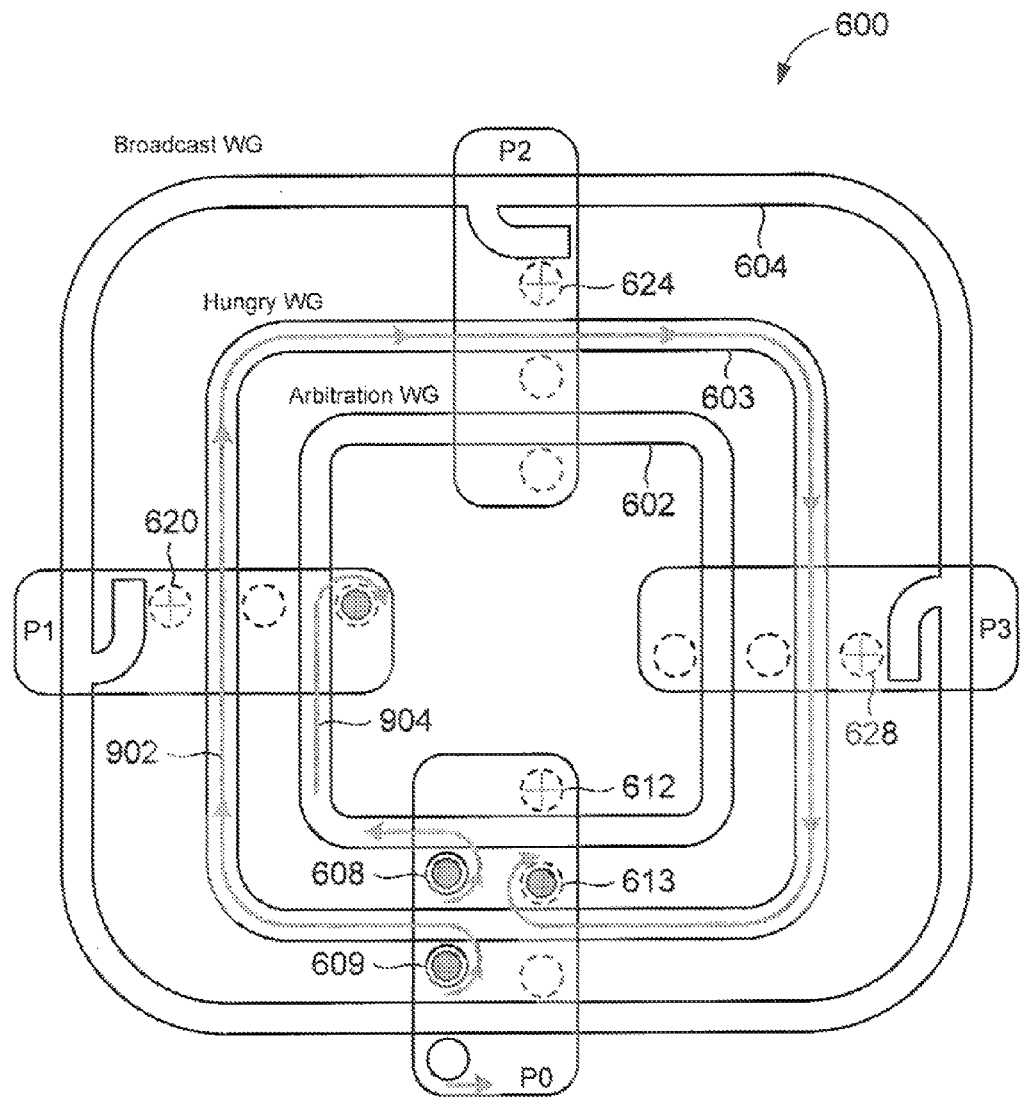
FIGS. 9A-9D show snapshots of a fair token-slot arbitration system during an example operation in accordance with one or more embodiments of the present invention.

Suppose that initially the nodes P1, P2, and P3 are in the satisfied state 701, shown in FIG. 7, and the channel is in the plenty state, shown in FIG. 8. As shown in the snapshot of FIG. 9A, because home node P0 controls access to the channel, node P0 turns "on" injector 609 in order to inject a continuous stream of light 902 into the hungry waveguide 603 and turns "on" detector 613 in order extract from, and confirm the presence of, the light 902 on the hungry waveguide 603. While light is detected at the detector 613, token-slot arbitration is performed on the arbitration waveguide 602 as described above with reference to FIGS. 4-5. Node P0 turns "on" detector 612 in order to extract any unextracted tokens from the arbitration waveguide. As shown in the snapshot of FIG. 9A, node P1 is in the process of extracting the token 904, gaining exclusive access to the corresponding slot in the channel for sending information to the node P0. Note that nodes P1, P2, and P3 have turned "on" detectors 620, 624, and 628, respectively, and wait for a broadcast from node P0 on broadcast waveguide 604.

Figure 9B:
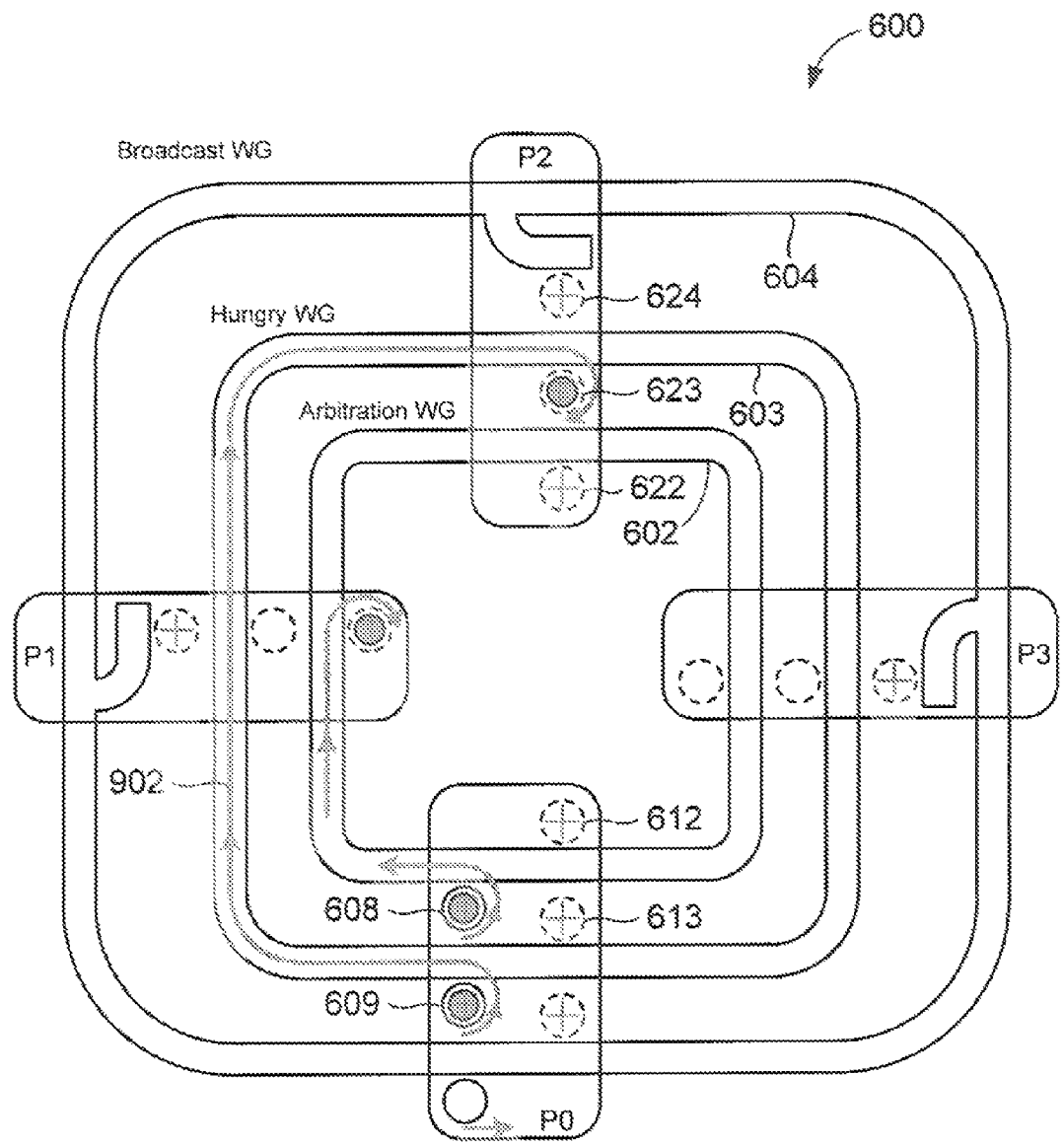

Now suppose that while node P1 has been extracting tokens from the arbitration waveguide, node P2 has entered the hungry state because packets destined for node P0 cannot be sent until node P2 can extract tokens from the arbitration waveguide. In other words, packets have been stored at node P2 longer than W or the queue length of node P2 is greater than L. Returning to FIG. 7, node P2 transitions from the satisfied state 701 to the hungry state 702 and marks the packets stored in the input queue for the channel. As shown in FIG. 9B, node P2 turns "on" the detectors 622-624 and begins extracting the light 902 from the hungry waveguide 603.

Figure 9C:
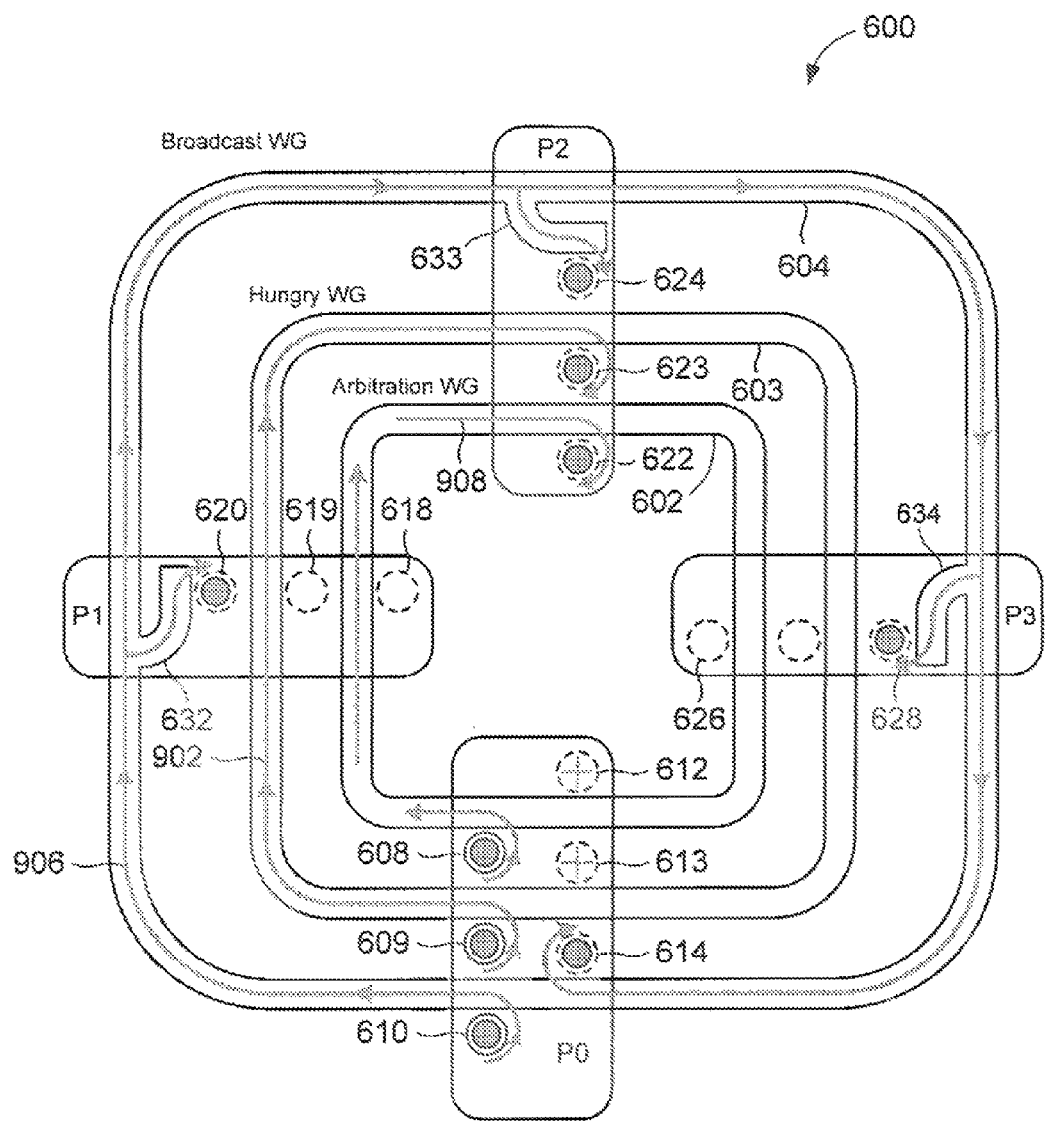

Returning to FIG. 8, when node P0 no longer detects light at the detector 613, node P0 places the channel into the famine state 804 and begins broadcast the famine state to the nodes P1, P2, and P3 on the broadcast waveguide. As shown in FIG. 9C, when node P0 enters the channel into the famine state, node P0 turns "on" injector 610 and detector 614 and injects light 906 into the broadcast waveguide 604. Portions of the light 906 are diverted by the detectors 620, 624, and 628 altering nodes P1, P2, and P3 that the channel is the famine state. Because node P1 is not in the hungry state, nodes P1 turns "off" detector 618 and node P3 leaves detector 626 turned "off." On the other hand, node P2 leaves on detectors 622 and 623 and extracts a token 908 from the arbitration waveguide and continues to extract light 902 from the hungry waveguide. Node P2 extract tokens consecutively until the marked packets are flushed. Any packets that arrive at node P2 after the hungry state has been declared join the queue, but these packets are not marked and sent during the famine state.

Figure 9D:
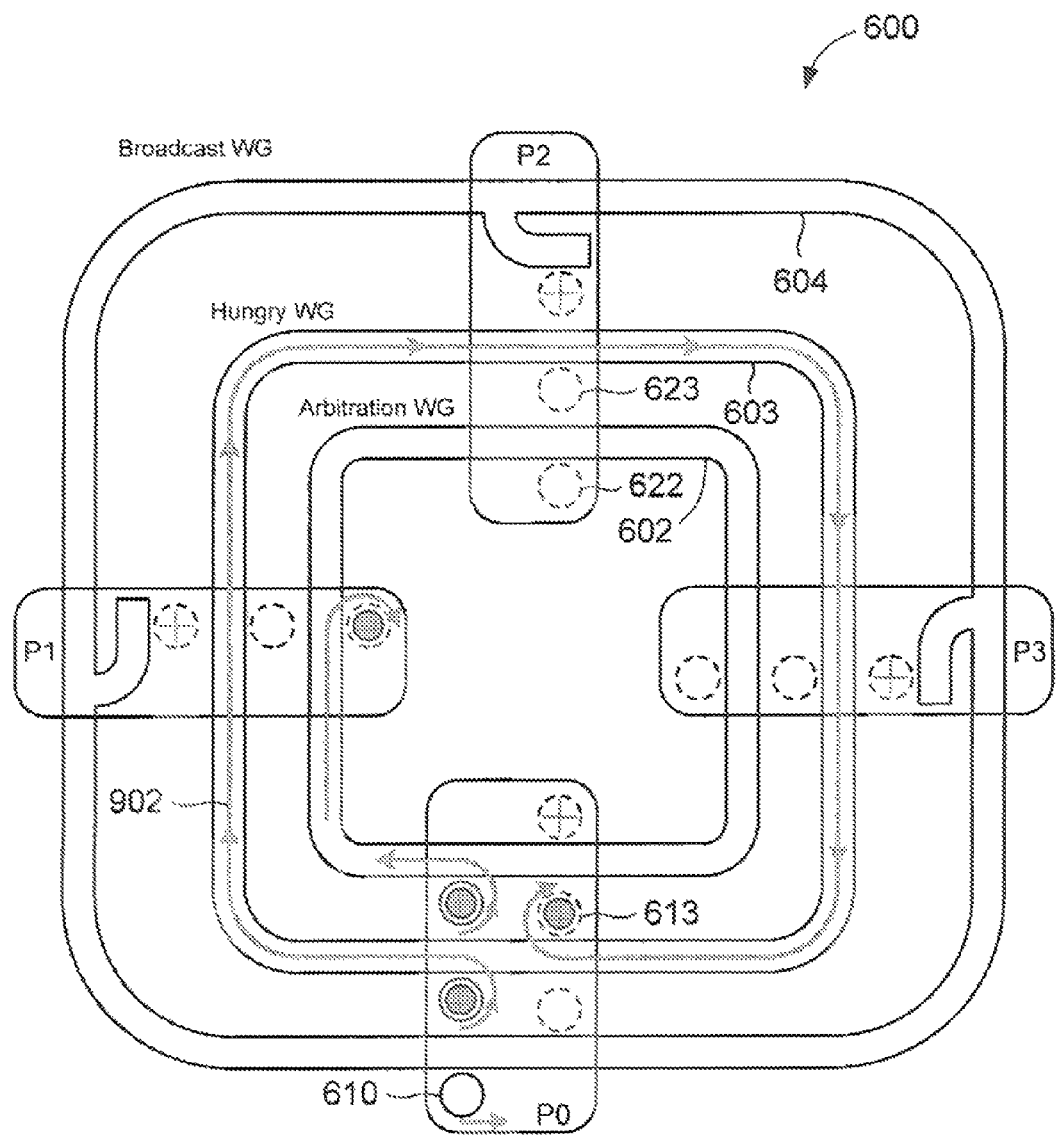

Once node P2 sends the last of the marked packets, node P2 enters the suspended state 703 shown in FIG. 7, in which node P2 turns "off" detectors 623 and 622 allowing light 902 to pass on the hungry waveguide 603 and the node P2 passes on all famine tokens, or tokens sent during the famine state. Returning to FIG. 8, when node P0 detects light on the hungry waveguide, node P0 re-enters the plenty state 802. As shown in the snapshot of FIG. 9D, node P2 has turned "off" detectors 622 and 623 restoring light 902 on the hungry waveguide 603. When node P0 detects the light at detector 613, node P0 turns "off" injector 610, nodes P1, P2, and P3 subsequently no long detect a broadcast on the broadcast waveguide 604, and the node P2 can enter the satisfied state and token-slot arbitration is again restored. On the next clock cycle node P2 can transition to the hungry state if it needs to.

In general, no node can remain in the hungry state indefinitely. For example, suppose a node h becomes hungry. It asserts its hunger as described above which reaches the home node and transitions to the famine state. In the following discussion, the term "current famine" means the epoch of consecutive clock cycles, including the clock cycles at which node h's hunger signal arrives at the home node, over which the home node emits famine tokens. The famine tokens of the current famine may be taken by other upstream hungry nodes that subsequently enter the hungry state while the node h is in the hungry state. None of these nodes will take more than L of the tokens during the current famine, because any node that takes L must have flushed its buffer and entered into a suspended state, keeping newly arrived packets in the queue. After the previously hungry upstream nodes have entered the suspended state, node h will eventually receive enough packets to flush the marked packets from its input queue, enter the suspended state, and de-assert hunger. No node returns to the hungry state before all the nodes that entered the hungry state when the node became hungry enter the suspended state.

Figure 10:
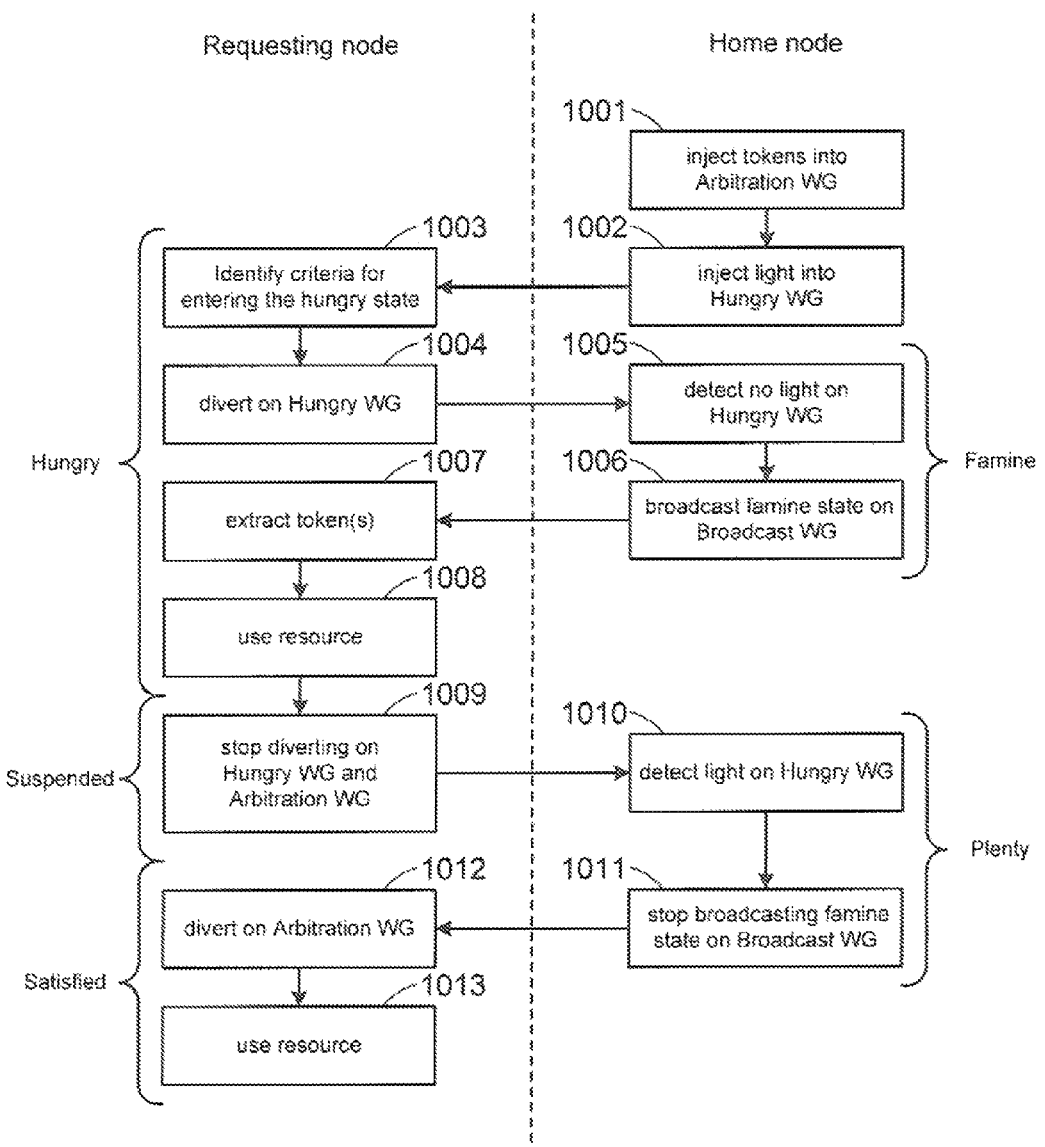
FIG. 10 shows an example control-flow diagram summarizing steps taken by a requesting node and a home node in accordance with one or more embodiments of the present invention.

FIG. 10 shows an example control flow diagram summarizing the steps taken by a requesting node and home node in transitioning through the state diagrams shown in FIGS. 7 and 8 in accordance with one or more embodiments of the present invention. In step 1001, the home node injects tokens into the arbitration waveguide. In step 1002, the home injects light into the hungry waveguide. In step 1003, the requesting node identifies the criteria for entering the hungry state. For example, the requesting node may realize that the packet wait time is greater than W or the input queue length is greater than L. In step 1004, the requesting node turns "on" the detector that diverts light from the hungry waveguide, as described above with reference to FIG. 9B. In step 1005, the home node detects no light on the hungry waveguide and enters the famine state. In step 1006, the home node broadcast on the broadcast waveguide causing other non-hungry nodes to stop taking tokens from the arbitration waveguide, as described above with reference to FIG. 9C. In step 1007, the hungry requesting node extracts tokens from the arbitration waveguide. In step 1008, the requesting node uses the resource. In step 1009, the requesting node enters the suspended state and stops diverting light from the hungry waveguide and from the arbitration waveguide. In step 1010, the home node detects light on the hungry waveguide and enters the plenty state. In step 1011, the home node stops broadcasting on the broadcast waveguide. In step 1012, the requesting node no longer detects light on the broadcast waveguide indicating that the famine state is over and enters the satisfied state where the node can extract tokens from the arbitration waveguide. In step 1013, the requesting node can use the resource when tokens are available.

Scalability

Figure 11:
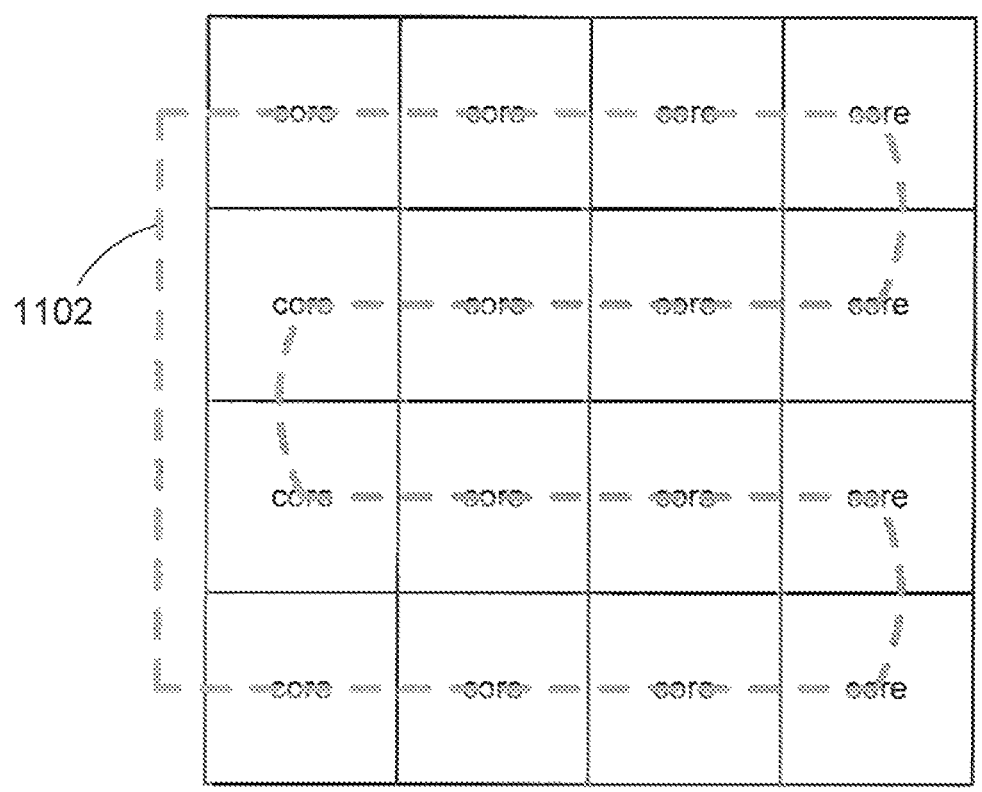
FIG. 11 shows a schematic representation of an example 16-core chip with an optical path that passes each core in accordance with one or more embodiments of the present invention.

Arbitration system and method embodiments of the present invention are not limited to systems having just four nodes. Arbitration, systems and methods can be scaled up or down in order to accommodate any number of nodes. For example, system and method embodiments can be applied to multicore processors. Because chip area is essentially fixed as core count grows with Moore's Law, each core in an N-core chip has an area proportional to 1/N and has a length and width proportional to $1/\sqrt{N}$. The arbitration, hungry, broadcast and power waveguides can be configured to follow a path that visits all N cores. FIG. 11 shows a schematic representation of an example 16-core chip with a path identified by dashed line 1102 that passes each core in accordance with one or more embodiments of the present invention. Path 1102 represents arbitration, hungry, broadcast and power waveguides that pass each core. The waveguides scale in length as N×width of one core (i.e., $=O(\sqrt{N})$). For example, when N equals 64 on a 576 mm² chip with a 5 GHz clock, flight time is 8 clock cycles. Electronic token arbiters delay the token at each node and therefore have a higher latency.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An arbitration system comprising:
a loop-shaped arbitration waveguide (602);
a loop-shaped hungry waveguide (603); and
a loop-shaped broadcast waveguide (604), wherein the arbitration, hungry, and broadcast waveguides are optically coupled to a home node and a number of requesting nodes, the arbitration waveguide transmits tokens injected by the home node, each token extracted by a requesting node gains access to a resource for the duration or length of the token, the hungry waveguide transmits light injected by the home node and is extracted by a requesting node in a hungry state, and the broadcast waveguide transmits light injected by the home node indicating to requesting nodes not in the hungry state to stop extracting tokens from the arbitration waveguide.

2. The system of claim 1 further comprising:
a first injector (608) optically coupled to the arbitration waveguide;
a second injector (609) optically coupled to the hungry waveguide; and
a third injector (610) optically coupled to the broadcast waveguide, wherein the first, second, and third, injectors are electronically coupled to, and operated by, the home node such that the first injector is operated to inject tokens into the arbitration waveguide, the second injector is operated to inject light into the hungry waveguide, and the third injector is operated to inject light into the broadcast waveguide.

3. The system of claim 1 wherein for each node the arbitration system further comprises:
a first detector (612,618) optically coupled to the arbitration waveguide;
a second detector (613,619) optically coupled to the hungry waveguide; and
a third detector (614,620) coupled to the broadcast waveguide, wherein the first, second, and third detectors are electronically coupled to, and operated by, the node such that the first detector is operated to extract tokens from the arbitration waveguide, the second detector is operated to extract light from the hungry waveguide, and the third detector is operated to extract light from the broadcast waveguide.

4. The system of claim 1 wherein a token is a pulse of light having finite duration and length (404).

5. The system of claim 1 wherein the broadcast waveguide further comprises fractional splitters (632-634) at the requesting nodes, each splitter configured to divert a portion of the light carried by the broadcast waveguide to the requesting nodes.

6. A method for a home node to control access to a resource offered for use to a number of requesting nodes, the method comprising:
injecting tokens into a loop-shaped arbitration waveguide (1001);
injecting light into a loop-shaped hungry waveguide (1002);
granting only requesting nodes in a hungry state exclusive access to the tokens when the light injected into the hungry waveguide fails to return to the home node along the hungry waveguide (1005,1006); and granting the requesting nodes access to the tokens when the light injected into the hungry waveguide returns to the home node along the hungry waveguide (1010,1011).

7. The method of claim 6 wherein injecting tokens into the arbitration waveguide further comprises injecting pulses of light (404) having a finite duration and length into the arbitration waveguide.

8. The method of claim 6 wherein granting requesting nodes access to the tokens further comprises performing toke-slot arbitration.

9. The method of claim 6 wherein when the light injected into the hungry waveguide fails to return to the home node along the hungry waveguide further comprises extracting the light on the hungry waveguide by the requesting node in a hungry state.

10. The method of claim 6 wherein granting only hungry requesting nodes exclusive access to the tokens further comprises injecting light into a broadcast waveguide indicating to requesting nodes not in the hungry state to stop extracting tokens from the arbitration waveguide.

11. A method for granting a requesting node access a resource controlled by a home node, the method comprising:

identifying criteria for entering the requesting node into a hungry state (1003);

announcing to the home node that the requesting node is in the hungry state (1004), wherein the home node grants the requesting node exclusive access to one or more tokens transmitted in a loop-shaped arbitration waveguide; and extracting one or more tokens from the arbitration waveguide (1007), each token grants the requesting node exclusive access of the resource for the duration or length of the token.

12. The method of claim 11 wherein identifying criteria for entering the requesting node into the hungry state further comprises at least one of:

determining when packets have been stored at the requesting node longer than a threshold of time; and determining when the requesting node's input queue length exceeds a queue length threshold.

13. The method of claim 11 further comprises transitioning the requesting node cyclically through the hungry state (702), a suspended state (703), and a satisfied state (701).

14. The method of claim 11 wherein announcing to the home node that the requesting node is in the hungry state (1009) further comprises extracting light from a hungry waveguide at the requesting node, the light injected by the home node.

15. The method of claim 11 wherein extracting tokens from the arbitration waveguide further comprises turning on a detector located adjacent to the arbitration waveguide, the detector configured to extract the token from the arbitration waveguide.

* * * * *

UNITED STATES PATENT AND TRADEMARK OFFICE
CERTIFICATE OF CORRECTION

PATENT NO. : 8,564,867 B2
APPLICATION NO. : 13/386382
DATED : October 22, 2013
INVENTOR(S) : Nathan Lorenzo Binkert et al.

It is certified that error appears in the above-identified patent and that said Letters Patent is hereby corrected as shown below:

In the Claims:

In column 13, line 12, in Claim 8, delete "toke-slot" and insert -- token-slot --, therefor.

Signed and Sealed this
Third Day of June, 2014

Michelle K. Lee
*Deputy Director of the United States Patent and Trademark Office*